April 29, 1958     W. J. BIELSTEIN     2,832,566
METHOD FOR MAINTAINING LEVEL OF DRILLING FLUID
Original Filed April 10, 1953
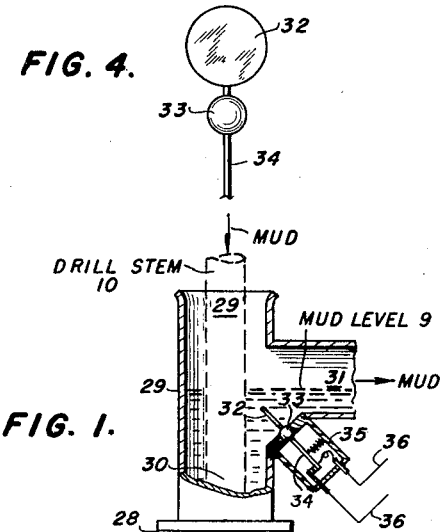
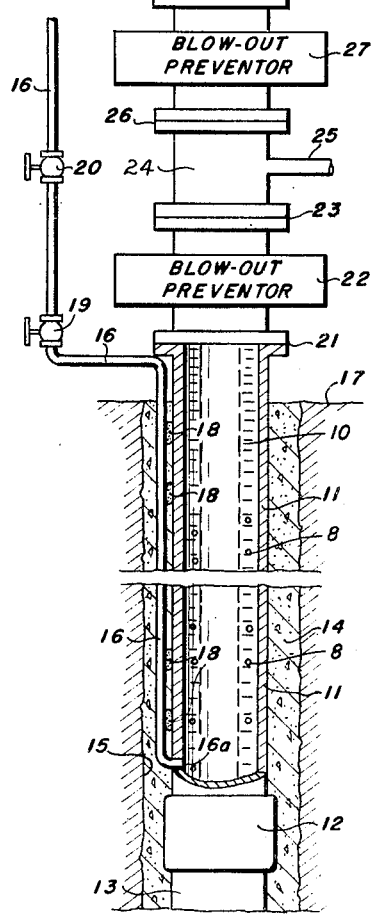
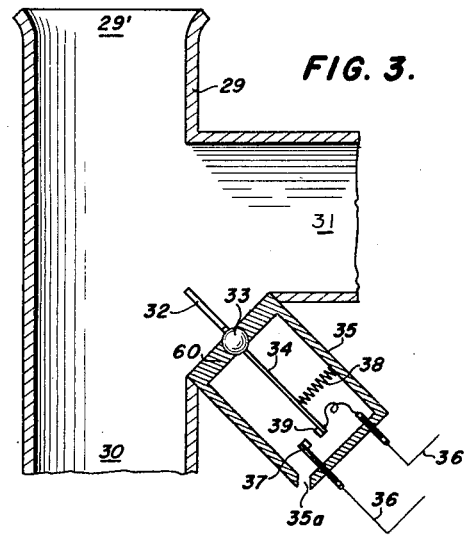
INVENTOR.
Walter J. Bielstein,
BY
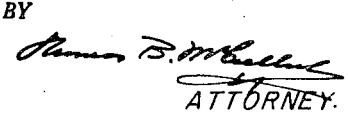
ATTORNEY.

United States Patent Office 2,832,566
Patented Apr. 29, 1958

2,832,566
METHOD FOR MAINTAINING LEVEL OF DRILLING FLUID

Walter J. Bielstein, Corpus Christi, Tex., assignor, by mesne assignments, to Esso Research and Engineering Company, Elizabeth, N. J., a corporation of Delaware Original application April 10, 1953, Serial No. 348,026. Divided and this application June 3, 1954, Serial No. 434,186

4 Claims. (Cl. 255—1.8)

The present invention is directed to a method and apparatus for determining the status of drilling fluid. More particularly, the invention is directed to a method and apparatus for determining the position and flow of drilling mud in the drilling of wells. In its more specific aspects, the invention is directed to a method and apparatus for warning drillers of the condition of a well in drilling operations.

This application is a division of U. S. Serial No. 348,026, now abandoned, entitled "Method and Apparatus for Determining Status of Drilling Fluid," filed April 10, 1953, for Walter J. Bielstein.

The present invention may be briefly described as a method for use in drilling wells in which drilling fluid such as water, an aqueous suspension of solids or an oil base mud, and the like, is circulated down a hollow drill stem and upward through an annulus between the drill stem and the wall of the well, the particular feature of the invention involving the steps of establishing a column of drilling fluid in the annulus and then establishing a column of air fluidly communicating with the column of drilling fluid. The top or level of the mud in the annulus varies depending on the operation being performed or the condition of the well. The column of fluid is balanced against a stream or column of air under pressure and the changes in the fluid level in respect to the column of air are measured by changes in the pressure required to balance the two columns of unequal densities. The change in the balancing pressure may be a result of several things among which will be removal of drill pipe from the bore hole without adding fluid, loss of returns of the drilling fluid, changes in the density of the drilling fluid, changes in circulation rate, etc. Changes in the air pressure required to balance the column of drilling fluid will be noted by the operating pressure, and if such changes are not normal to the operation or conditions of the hole, then measures may be taken immediately to correct the condition.

Thus, the present invention contemplates establishing a column of drilling fluid and a column of air in fluid communication with each other at the lower end of the column of air and further establishing equilibrium conditions between the two columns. As the column of drilling fluid tends to lose drilling fluid and equilibrium tends to be disturbed or lost, my invention allows restoration of equilibrium by adding drilling fluid to the column of drilling fluid as the equilibrium becomes disturbed.

The invention also involves apparatus for determining flow of drilling fluid from the well which comprises, in combination, a bell nipple having an inlet and at least an outlet whose longitudinal axis defines a near right angle with the longitudinal axis of the inlet. The bell nipple has a ball bearing journalled in a wall thereof to which is rigidly attached an actuator member which protrudes into a path of flow from the inlet of the bell nipple to said outlet thereof. A switch member is connected to the ball bearing at a point opposite to the actuator member, the switch member having a free end provided with a first electrical contact means. A housing is mounted on the wall of said bell nipple enclosing the switch member and a second electrical contact means is mounted in the housing and is arranged in operative relationship with the first electrical contact means to complete an electrical circuit. A biasing means, such as a coil spring, is connected to the free end of the switch member and to the interior wall of the housing to urge normally the switch means and said first electrical contact means away from contact with the second electrical contact means. A warning means is electrically connected to the first and second electrical contact means to provide an alarm on movement of the actuator member by movement of the drilling fluid along the path of flow.

The invention will be further illustrated by reference to the drawing in which

Fig. 1 shows an arrangement of one type of apparatus for indicating the status of the drilling fluid in the drilling of a well;

Fig. 2 shows an arrangement for indicating the status of drilling fluid in a well and the flow of drilling fluid from the well;

Fig. 3 is a sectional view of the bell nipple and its allied parts of the apparatus of Fig. 2; and Fig. 4 is a view taken at right angles to and showing a portion of the device of Figs. 1, 2 and 3.

Referring now to the drawing, numeral 11 indicates the top joint of a casing in a well bore 15 which is connected by a collar 12 to the second joint of the casing 13, both of which may be retained by cement 14 in the well bore 15. Connected to top joint 11 in the casing string near the surface is a small tubing 16 which is lead down from the earth's surface 17 down through the annulus between the casing string and the well bore 15. The tubing 16 should be constructed preferably of metal capable of withstanding pressures equal to the test pressure of the top joint 11 and suitably may be a steel or copper tubing or the like which may be readily attached by welds 18 to the top joint 11, as shown. The tubing 16 may also be provided with valves 19 and 20 for the purpose of blanking off the lower portion of tubing 16 from the indicating apparatus. The tubing 16 leads to the driller's position, as will be described in more detail hereinafter. Connected to the top joint 11 by suitable connection means 21 are standard blow-out assemblies and the like which may consist of one or more blow-out assemblies. For illustrative purposes, a two blow-out assembly is shown. Thus a bottom blow-out assembly or preventer 22 is connected to connection means 21 and to flange 23. Connected to flange 23 is a spool or connecting means 24 which may be provided with a tubing 25 which may lead to a choke manifold and may be employed for controlling pressures that may develop in the annulus between the hollow drill stem or string and the casing string. The spool 24 is connected by flange 26 to a top blow-out preventer 27.

Connected to the top blow-out preventer or top of a single or plurality of blow-out preventer assemblies is a large diameter line 29 which describes approximately a right angle to the vertical wellhead assembly for the purpose of directing the returning drilling fluid in the annulus to the mud pits. For purposes of illustration, this line 29 is commonly called a bell nipple having an inlet 30 and an outlet 31. The bell nipple is connected to the top blow-out preventer 27 by flange 28. The bell nipple 29 has a second outlet 29' through which the hollow drill stem or string, not shown, is inserted for conducting the drilling operations. The outlet 31 communicates with the mud pit. Arranged in the bell nipple 29 in a path of flow from the inlet 30 to the outlet 31 is an actuator member 32 connected to a ball bearing 33 provided with a switch member 34. The switch member 34 is enclosed in a housing 35. The switch member 34 is connected by electrical leads 36 to the driller's position as will be described in more detail hereinafter. A drill stem 10, shown in dotted lines to which a drilling bit not shown is connected, is arranged in the casing 11 and extends upwardly through the blowout preventers 22, 27 and through the bell nipple 29 to the derrick floor, not shown. Mud is circulated down the drill stem 10 to form a mud level, such as 9, which discharges through the outlet 31 of line 29. The air introduced through line 16 bubbles upwardly through the mud, such as shown by bubbles 8, and is discharged at the mud level 9.

In Fig. 2 the mud level 9 has dropped below the outlet 31 and below the element 32 resulting from a disturbance in initial equilibrium conditions. It is to be noted in Fig. 1 the drill stem is shown in the well, whereas in Figs. 2 and 3, the drill stem is not in the well.

Referring now to Fig. 2, identical numerals are employed to designate identical parts, it will be seen that the steel or copper tubing 16 is provided with an inlet 40 leading to a source of compressed air, not shown, and further is provided with a control valve 41. Connected to the tubing 16 is a conduit 42 to which is connected by tubing 43 a pressure gauge 44 which may be of the Bourdon tube type. Also connected to the conduit 42 by a conduit 45 is a pressure switch, of the conventional type, 46 which serves to energize a warning device 47 electrically connected thereto by electrical lead 48. The warning device 47 may be a suitable light or signal means. Electrically connected to the lead 48 is an electrical connection 49 leading to an audible warning device 50 which suitably may be a bell, whistle, or the like, energized by electrical energy. The visual warning device 47 and the audible warning device 50 both receive electrical energy from the battery 51 through suitable electrical connections 52 and 53. It is understood, of course, that a suitable source of E. M. F., other than battery 51, may be substituted therefor.

It will be noted with respect to Fig. 2 that the housing 35 is provided with a second electrical contacting means 37 and a biasing means, such as a coil spring 38, which normally urges the switch member 34 and its electrical contact means 39 out of contact with electrical contact 37.

Referring now to Fig. 3 which is a single view of a portion of the apparatus of Figs. 1 and 2, apart from the remainder of the apparatus, it will be seen that the ball bearing 33 is journalled in the wall member 60 of the bell nipple 29 and the actuator member 32 protrudes in a path of flow from the inlet 30 to the outlet 31. Also it will be seen that the switch member 34 is attached to the ball bearing 33 at a point opposite to the actuator member 32. The housing 35 serves to enclose the switch member 34, the spring 38 and the second electrical contact means 37. It will be noted that the electrical leads 36 are shown in more detail in Fig. 3. The housing 35 is provided with a drain port 35a for drainage of any moisture or fluid which may collect therein. It is contemplated that the ball bearing 33 journalled in the wall 60 will be suitably sealed from ingress of drilling fluid from the path of flow to the interior of the housing 35.

The apparatus of the present invention operates in the following manner:

During the drilling operations, it is desirable to maintain a level of drilling mud in the top joint of the casing to permit visual inspection of the status of the drilling mud; however, human frailty being what it is, it is not uncommon for drillers not to notice the condition of the drilling mud or fluid. In my invention, a warning is sounded when the drilling mud level falls below a certain point. In addition, an indicated pressure is available at all times from which to predict and anticipate changes in mud level. I connect into the top joint of the casing at a point varying from 25 to 75 feet below the earth's surface a steel tubing through which air is introduced at a fixed minute rate and at a pressure sufficient to overcome the column of mud above the point where the tubing 16 connects to the casing 11. This air pressure will be slightly higher than that required to balance the head of fluid from the opening in the casing to the height of the flow line. Just higher than the balancing pressure, the minute amount of air entering the tube will bubble through the opening of the tube 16 at the point 16a into the top joint 11, and the slightly higher than balancing pressure will be indicated at the driller's position "P" which will show the height of the mud column above the small opening 16a in the casing 11. A pressure-operated switch, such as 46, will energize a light, such as 47, which will remain on until the drilling fluid within the casing 11 drops to the approximate height of the opening 16a. At this point, the air pressure will approach zero pounds per square inch and allow pressure-operated switch 46 to open and the signal light to go out, indicating to the driller that mud should be added to restore the column of mud and air to original equilibrium conditions.

In the device of Fig. 3 also shown in Figs. 1 and 2, the actuator member 32 becomes operative when the flow of fluid passes the member 32 causing the contacts 39 and 37 to complete the circuit. This causes a second light 70 to be energized which shows the driller at the position "P" that fluid is being circulated. Also the audible signalling means 61 can be caused to sound. This audible signalling means may be an electrically-operated horn or a bell and the like. The light or the audible signalling means will remain on when fluid is circulating by member 32. When no fluid is passing 32, such as when pumps are stopped and no fluid is being circulated, or when the pumps are operating and return of the fluid to the surfaces has ceased because of going into the formation, the light will be off. During periods when fluid is not being circulated and the light fails to go out, it will indicate that the well is flowing for some reason that should be investigated.

The device of the present invention has many advantages and much utility in that it alarms the drilling crew when mud has fallen in the hole a predetermined amount when pulling the pipe from the hole. It also alarms the drilling crew when returns are lost. During periods when mud flows back during operations which normally require the well to be shut down, the crew is alerted by means of my method and device. Also the present invention informs and alarms the drilling crew when a material change in drilling mud weight occurs.

The present invention also provides positive limits for measuring the amount of fluid required during trips into and out of the hole and gives a positive measurment of the amount of mud which has dropped as the pipe is pulled from the hole. By having these positive measurements, it is possible to measure accurately when and if a well is attempting to flow.

During drilling operations if the returns light, such as 70, goes out and the pressure drops on the gauge 44, it is indicative of returns being lost or only partial returns being obtained. In operations such as going into the hole if the returns light does not light up while running each stand of pipe in the hole, it is possible that mud returns have been lost. If the returns light fails to go out after the pipe slips are set, it is indicative that the well may be attempting to flow.

The nature and objects of the present invention having been completely described and illustrated, what I wish to claim as new and useful and to secure by Letters Patent is:

1. In the drilling of a well wherein drilling fluid is circulated through the bore during drilling thereof and wherein the level of the column of drilling fluid is normally maintained at a predetermined level, the improvement therein comprising the steps of injecting a stream of air into the column of drilling fluid under a pressure which is equal to the pressure of the column of drilling fluid to provide equilibrium between the stream of air and the column of drilling fluid, and varying the supply of drilling fluid as the state of equilibrium between the stream of air and the column of drilling fluid is unbalanced due to disruption thereof by reason of any change in the pressure of the column of drilling fluid.

2. In the drilling of a well wherein drilling fluid is circulated through the bore during the drilling thereof and wherein the level of the column of drilling fluid is normally maintained at a predetermined level, the improvement therein comprising the steps of injecting a stream of air into the column of drilling fluid under a pressure which is equal to the pressure of the column of drilling fluid to provide equilibrium between the stream of air and the column of drilling fluid, and increasing the supply of drilling fluid as the state of equilibrium between the stream of air and the column of drilling fluid is unbalanced due to disruption thereof by reason of any decrease in the pressure of the column of drilling fluid.

3. A method in accordance with claim 2 in which the drilling fluid is mud.

4. A method in accordance with claim 2 in which the drilling fluid is an oil base mud.

References Cited in the file of this patent
UNITED STATES PATENTS

| | | |
|---|---|---|
| 1,566,338 | Mayhew | Dec. 22, 1925 |
| 1,977,969 | McIntosh | Oct. 23, 1934 |
| 2,283,477 | Walker | May 19, 1942 |
| 2,340,993 | Smith | Feb. 8, 1944 |
| 2,360,742 | Toth et al. | Oct. 17, 1944 |
| 2,615,442 | Berry | Oct. 28, 1952 |